(12) United States Patent
Slayter et al.

(10) Patent No.: US 10,473,164 B2
(45) Date of Patent: Nov. 12, 2019

(54) MECHANICAL SHEAR FUSE FOR ENGINE MOTORING SYSTEM

(71) Applicant: Hamilton Sundstrand Corporation, Charlotte, NC (US)

(72) Inventors: Matthew Allen Slayter, Rockford, IL (US); Richard Alan Davis, Stillman Valley, IL (US); Benjamin T. Harder, DeKalb, IL (US); James Vandung Nguyen, Rockford, IL (US); Paul F. Fox, Loves Park, IL (US); Jeffrey Todd Roberts, Winnebago, IL (US); Jeff A. Brown, Cherry Valley, IL (US); Brian McMasters, Caledonia, IL (US); Dwayne Leon Wilson, Rockford, IL (US); Daniel Richard Walker, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 551 days.

(21) Appl. No.: 15/202,217

(22) Filed: Jul. 5, 2016

(65) Prior Publication Data
US 2018/0010648 A1    Jan. 11, 2018

(51) Int. Cl.
F16D 9/08 (2006.01)
F01D 15/12 (2006.01)
F02C 7/268 (2006.01)
F01D 25/36 (2006.01)
(Continued)

(52) U.S. Cl.
CPC ............... *F16D 9/08* (2013.01); *F01D 15/12* (2013.01); *F01D 25/36* (2013.01); *F02C 7/268* (2013.01); *F02C 7/275* (2013.01); *F02C 7/32* (2013.01); *F05D 2220/32* (2013.01);
(Continued)

(58) Field of Classification Search
CPC .............................. F16D 9/06; F05D 2260/311
See application file for complete search history.

(56) References Cited

U.S. PATENT DOCUMENTS 2,161,501 A * 6/1939 Blackmon ............. E21B 17/046
403/328
2,748,578 A * 6/1956 Potts .................... F04D 29/044
384/193
(Continued)

FOREIGN PATENT DOCUMENTS

FR    1521603 A    4/1968
WO    2016069303 A1    5/2016

OTHER PUBLICATIONS

European Search Report for Application No. 17179820.0-1607; Report dated Nov. 21, 2017; Report Received Date: Nov. 20, 2017; 1-7 pages.

*Primary Examiner* — Terence Boes
(74) *Attorney, Agent, or Firm* — Cantor Colburn LLP

(57) ABSTRACT

A motoring system for a gas turbine engine having: a reduction gear train having an input and an output; an electric motor operably connected to the input; a clutch operably connected to the output, the clutch in operation engages and disengages the reduction gear train; and a mechanical shaft fuse operably connecting the output to the clutch, the mechanical shaft fuse in operation shears when torque on the mechanical shaft fuse is greater than or equal to a selected value. The mechanical shaft fuse includes a plurality of through holes.

9 Claims, 3 Drawing Sheets

(51) Int. Cl.
 *F02C 7/275* (2006.01)
 *F02C 7/32* (2006.01)
(52) U.S. Cl.
 CPC .............. *F05D 2260/311* (2013.01); *F05D 2260/4023* (2013.01); *F05D 2260/4031* (2013.01)

(56) References Cited

U.S. PATENT DOCUMENTS

| | | | | |
|---|---|---|---|---|
| 3,153,334 | A | * 10/1964 | Vutz | F16D 9/06 464/32 |
| 5,195,401 | A | 3/1993 | Mouton | |
| 2011/0150596 | A1 | * 6/2011 | Wolodko | E21B 17/06 411/5 |
| 2013/0032326 | A1 | * 2/2013 | Lea-Wilson | E21B 17/06 166/55 |

* cited by examiner

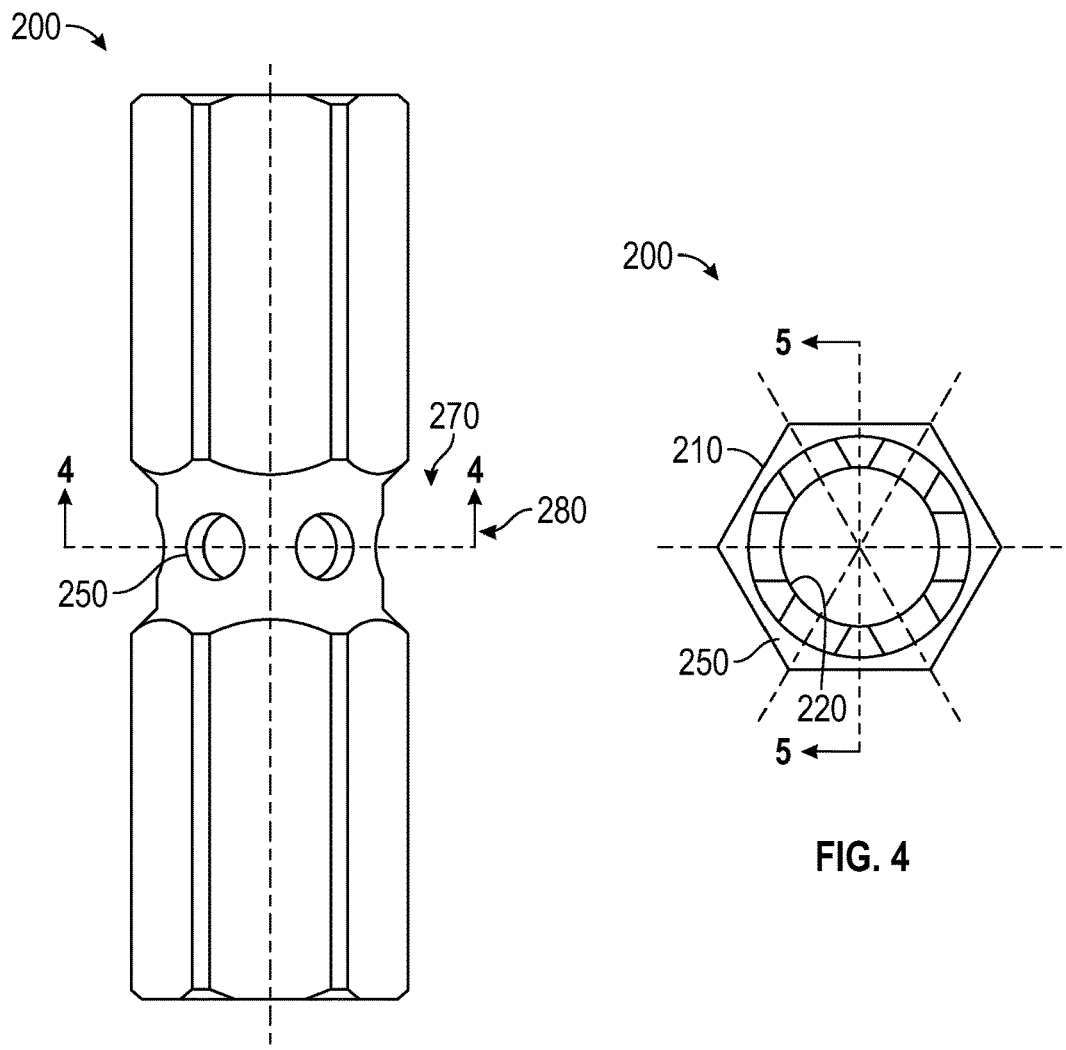
FIG. 3
FIG. 4
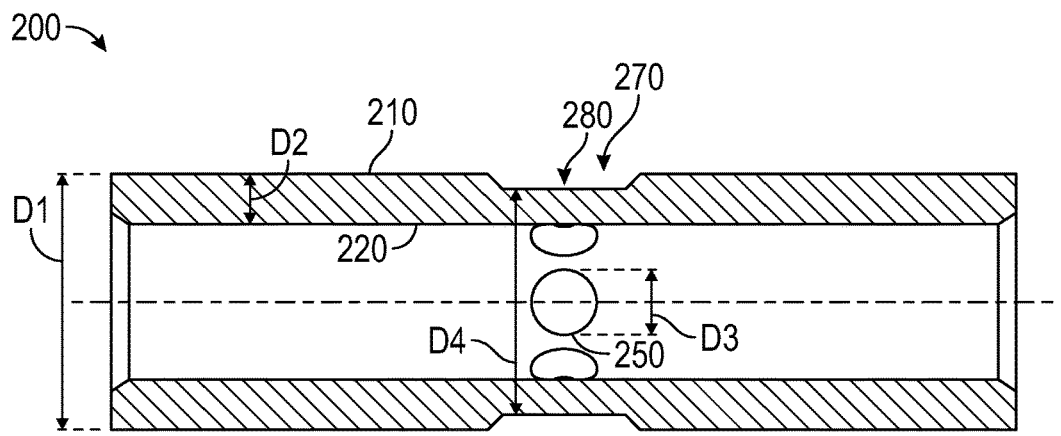
FIG. 5

MECHANICAL SHEAR FUSE FOR ENGINE MOTORING SYSTEM

BACKGROUND

The subject matter disclosed herein generally relates to engine motoring systems, and more specifically to an apparatus and a method for protecting an aircraft engine starter motor from overspeed.

Gas turbine engines used on modern aircraft are composed of a compressor, a combustion chamber, a turbine, and a main shaft connecting the turbine to the compressor. External air is compressed by the compressor and sent to the combustion chamber where an air-gas mixture combusts and provides thrust to the aircraft as it exits the engine. The combusted air-gas mixture also rotates the turbine as it exits the engine and the turbine rotates the compressor through the main shaft. At various times, the main shaft may need to be slowly rotated or motored to maintain thermal equilibrium throughout the engine.

SUMMARY

According to one embodiment, a motoring system for a gas turbine engine is provided. The motoring system having: a reduction gear train having an input and an output; an electric motor operably connected to the input; a clutch operably connected to the output, the clutch in operation engages and disengages the reduction gear train; and a mechanical shaft fuse operably connecting the output to the clutch, the mechanical shaft fuse in operation shears when torque on the mechanical shaft fuse is greater than or equal to a selected value. The mechanical shaft fuse includes a plurality of through holes.

In addition to one or more of the features described above, or as an alternative, further embodiments of the motoring system may include that the plurality of through holes are oriented around an approximate axial center point of the mechanical shaft fuse.

In addition to one or more of the features described above, or as an alternative, further embodiments of the motoring system may include that each of the holes has a diameter of about 0.187 inches (0.475 centimeters).

In addition to one or more of the features described above, or as an alternative, further embodiments of the motoring system may include that the plurality of holes includes six holes.

In addition to one or more of the features described above, or as an alternative, further embodiments of the motoring system may include that the selected value is about 64 foot-pounds (87 newton-meters).

In addition to one or more of the features described above, or as an alternative, further embodiments of the motoring system may include that the mechanical shaft fuse includes a first outer diameter of about 0.63 inches (1.6 centimeters).

In addition to one or more of the features described above, or as an alternative, further embodiments of the motoring system may include that the mechanical shaft fuse is hollow and includes a thickness of about 0.09 inches (0.229 centimeters).

In addition to one or more of the features described above, or as an alternative, further embodiments of the motoring system may include that the mechanical shaft fuse has a hexagonal cross-sectional shape.

In addition to one or more of the features described above, or as an alternative, further embodiments of the motoring system may include that the mechanical shaft fuse further includes: a second outer diameter located at about an approximate axial center point of the mechanical shaft fuse, the second outer diameter being less than the first outer diameter.

According to another embodiment, a method of manufacturing a motoring system for a gas turbine engine is provided. The method including the steps of: forming a mechanical shaft fuse, the mechanical shaft fuse including a plurality of through holes; forming an outer housing; installing a reduction gear train into the outer housing, the reduction gear train having an input and an output; operably connecting an electric motor to the input; operably connecting a clutch to the output using the mechanical shaft fuse, the clutch in operation engages and disengages the reduction gear train. The mechanical shaft fuse in operation shears when torque on the mechanical is greater than or equal to a selected value.

In addition to one or more of the features described above, or as an alternative, further embodiments of the method may include that the plurality of through holes are oriented around an approximate axial center point of the mechanical shaft fuse.

In addition to one or more of the features described above, or as an alternative, further embodiments of the method may include that each of the holes has a diameter of about 0.187 inches (0.475 centimeters).

In addition to one or more of the features described above, or as an alternative, further embodiments of the method may include that the plurality of holes includes six holes.

In addition to one or more of the features described above, or as an alternative, further embodiments of the method may include that the selected value is about 64 foot-pounds (87 newton-meters).

In addition to one or more of the features described above, or as an alternative, further embodiments of the method may include that the mechanical shaft fuse includes a first outer diameter of about 0.63 inches (1.6 centimeters).

In addition to one or more of the features described above, or as an alternative, further embodiments of the method may include that the mechanical shaft fuse is hollow and includes a thickness of about 0.09 inches (0.229 centimeters).

In addition to one or more of the features described above, or as an alternative, further embodiments of the method may include that the mechanical shaft fuse has a hexagonal cross-sectional shape.

In addition to one or more of the features described above, or as an alternative, further embodiments of the method may include that the mechanical shaft fuse further includes: a second outer diameter located at about an approximate axial center point of the mechanical shaft fuse, the second outer diameter being less than the first outer diameter.

Technical effects of embodiments of the present disclosure include a mechanical shaft fuse in a drive line connecting a motor to a turbine engine. The mechanical shaft fuse being capable to withstand a torque required for normal operation of a motoring system and is also configured to shear when the torque is greater than or equal to a selected value.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 3 is a schematic illustration of mechanical shaft fuse of the motoring system of FIG. 2, according to an embodiment of the present disclosure;

FIG. 4 is a cross-sectional view of the mechanical shaft fuse of the motoring system of FIG. 2, according to an embodiment of the present disclosure;

FIG. 5 is a cross-sectional view of the mechanical shaft fuse of the motoring system of FIG. 4, according to an embodiment of the present disclosure.

The detailed description explains embodiments of the present disclosure, together with advantages and features, by way of example with reference to the drawings.

DETAILED DESCRIPTION

Figure 1:
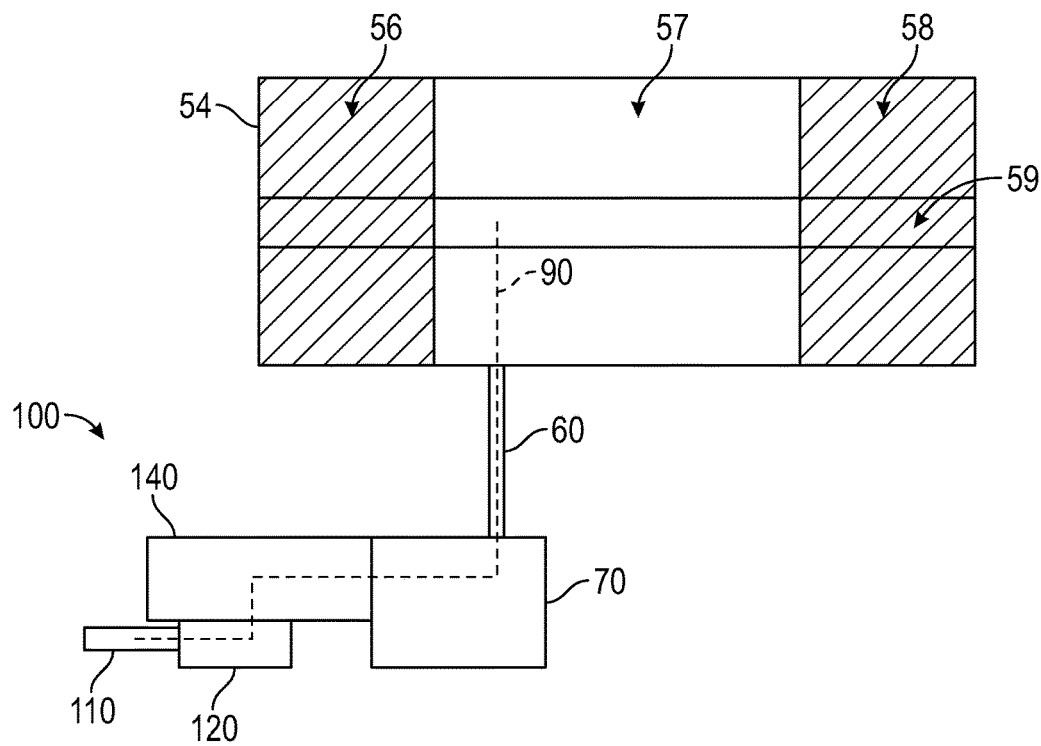
FIG. 1 is a block diagram of an engine and associated motoring system, according to an embodiment of the present disclosure.
Figure 2:
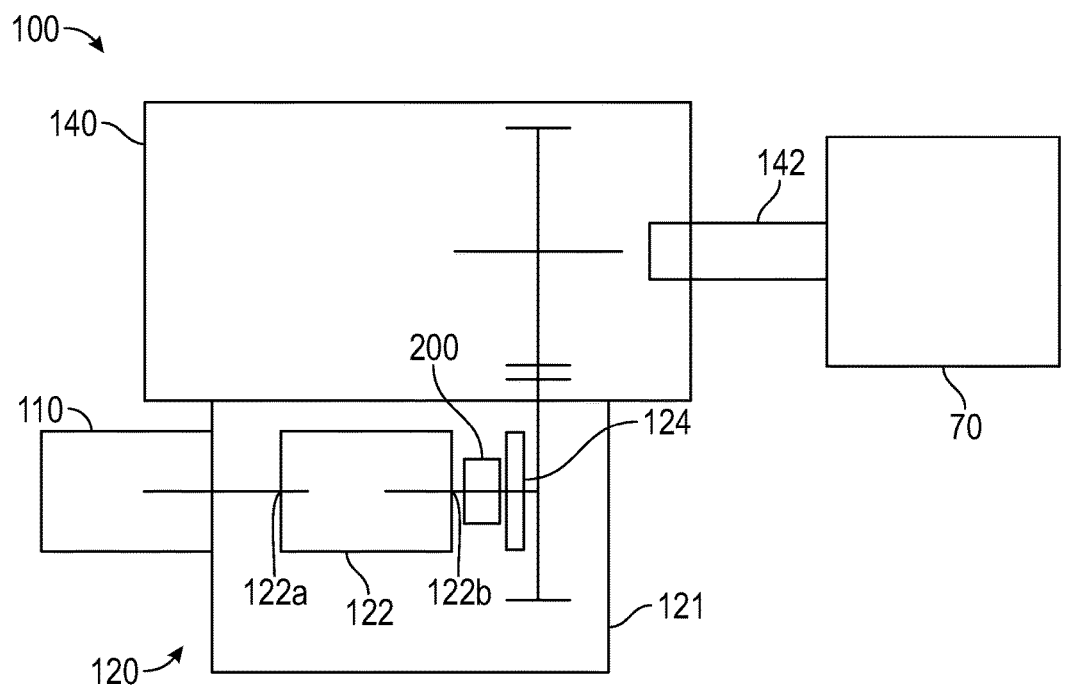
FIG. 2 is a block diagram of the motoring system of FIG. 1, according to an embodiment of the present disclosure.

Referring now to FIGS. 1-2, various embodiments of the present disclosure are illustrated. FIG. 1 shows a block diagram of an engine 54 and associated motoring system 100, according to an embodiment of the present disclosure. The engine 54 may be a gas turbine engine that may be used on an aircraft. FIG. 2 shows a block diagram of the motoring system 100 of FIG. 1, according to an embodiment of the present disclosure. Generally, the motoring system 100 includes a motor 110, a reduction gearbox 120, and a starter 140. The motoring system 100 is operably connected to the engine 54 through an accessory gear box 70 and drive shaft 60, as shown in FIG. 1. The reduction gearbox 120 includes an outer housing 121 and a reduction gear train 122 within the outer housing 121. The reduction gear train 122 includes an input 122a and an output 122b. The motor 110 is operably connected to the reduction gear train 122 at the input 122a. In an embodiment, the motor 110 may be an electric motor. A clutch 124 is operably connected to the reduction gear train 122 at the output 122b. The clutch 124 may be operably connected to accessory gearbox 70 through the starter 140 and the output shaft 142. In operation, the clutch 124 may engage and disengage the reduction gear train 122.

As shown in FIG. 1, the motor 110 is configured to execute a motoring process of the engine 54 by getting the main shaft 59 of the engine 54 rotating. The main shaft 59 operably connects the compressor 56 to the turbine 58. Thus, once the compressor 56 starts spinning, compressed air is pulled into the combustion chamber 57 and mixed with gas for combustion. Once the air and gas mixture combust in the combustion chamber 57, the controlled explosion is then accelerated past blades attached to the turbine 58, which rotates the turbine 58 and subsequently the compressor 56. The motor 110 is connected to the engine 54 by a drive line 90, which runs from the motor 110, to the reduction gear train 122, to the clutch 124, to the starter 140, to the starter output shaft 142, to the accessory gearbox 70, to the drive shaft 60, and finally to the main shaft 59 of the engine 54. The motor 110 operates at a high angular velocity to initiate the motoring process and gets the main shaft 59 of the engine 54 turning at a low angular velocity. During the motoring process the clutch 124 is engaged so that rotational toque is transferred from the motor 110 to the main shaft 59 through the drive line 90. Once the motoring process has been completed, the motor 110 will need to be disengaged from the engine 54 because the motor 110 may overspeed when the engine 54 begins to operate at its normal high speed. Thus, the clutch 124 disengages the reduction gear train 122 once the motoring process has been completed. The clutch 124 also disengages the reduction gear train 122 during an engine start up process.

If the clutch 124 fails to disengage the reduction gear train 122, damage to the motor 110 may result due to overspeed. A mechanical shaft fuse 200 (FIG. 3) may be incorporated into the drive line 90 to help protect the motor 110 from overspeed in the event the clutch 124 fails to disengage. The reduction gear train 122 is operably connected to the clutch 124 through the mechanical shaft fuse 200 as seen in FIG. 2. The mechanical shaft fuse 200 in operation shears when torque on the mechanical shaft fuse 200 is greater than or equal to a selected value. In an embodiment, the selected value may be about 64 foot-pounds (87 newton-meters).

Referring now to FIGS. 3-5, various views a of a shaft fuse according to embodiments of the present disclosure are illustrated. FIG. 3 show a schematic illustration of mechanical shaft fuse 200 of the motoring system 100 of FIG. 2, according to an embodiment of the present disclosure. FIG. 4 is a cross-sectional view of the mechanical shaft fuse 200 of the motoring system 100 of FIG. 2, according to an embodiment of the present disclosure. FIG. 5 is a cross-sectional view of the mechanical shaft fuse 200 of the motoring system 100 of FIG. 4, according to an embodiment of the present disclosure.

As seen in FIGS. 3-5, the mechanical shaft fuse 200 includes a plurality of through holes 250. The through holes 250 may vary in a variety of attributes such as, for example, size, shape, quantity and location on the mechanical shaft fuse 200. The plurality of through holes 250 may be oriented around an approximate axial center point 280 of the mechanical shaft fuse 200, as seen in FIG. 3 with line 4-4 passing through the axial center point 280. Also, each of the holes 250 may have a diameter D3 of about 0.187 inches (0.475 centimeters), as seen in FIG. 5. The plurality of holes 250 may comprise six holes 250, as seen in FIG. 4.

Further, the mechanical shaft fuse 200 may come in a variety of shapes as long as it operably connects the output 122b of the reduction gear train 122 to the clutch 124. As seen in FIG. 3, the mechanical shaft fuse 200 may have an elongated shape to bridge the gap between the output 122b and the clutch 124 and connected the output 122b to the clutch 124. Additionally, the mechanical shaft fuse 200 may have a hexagonal cross-sectional shape, as seen in FIG. 3. The hexagonal shape, may allow the mechanical shaft fuse 200 to fit into a mating part of the output 122b and the clutch 124. The mechanical shaft fuse 200 may have a first outer diameter D1 of about 0.63 inches (1.6 centimeters). The mechanical shaft fuse 200 may comprises a reduced outer diameter 270 located at about an approximate center point 280 of the mechanical shaft fuse 200. The second outer diameter D4 at the reduced outer diameter 270 is less than the first outer diameter D1 at other locations of the mechanical shaft fuse 200. This reduction in diameter is not required but may help further control the required force to shear the mechanical shaft fuse 200, in addition to the holes 250.

Further, the mechanical shaft fuse 200 may be either solid or hollow. In the illustrated embodiment the mechanical shaft fuse 200 is hollow and has an outer surface 210 and an inner surface 220, as seen in FIG. 5. In an embodiment, the thickness D2 of the hollow mechanical shaft fuse 200 or the distance D2 between the outer surface 210 and the inner surface 220 may be about 0.09 inches (0.229 centimeters).

Advantageously, a mechanical shaft fuse may withstand a torque required for normal operation of a motoring system but then also shear when the torque is greater than or equal to a selected value. The torque being greater than or above a selected value may indicate that a clutch failed to disengage the engine from the motor once the engine reached normal operating angular velocities.

Figure 6:
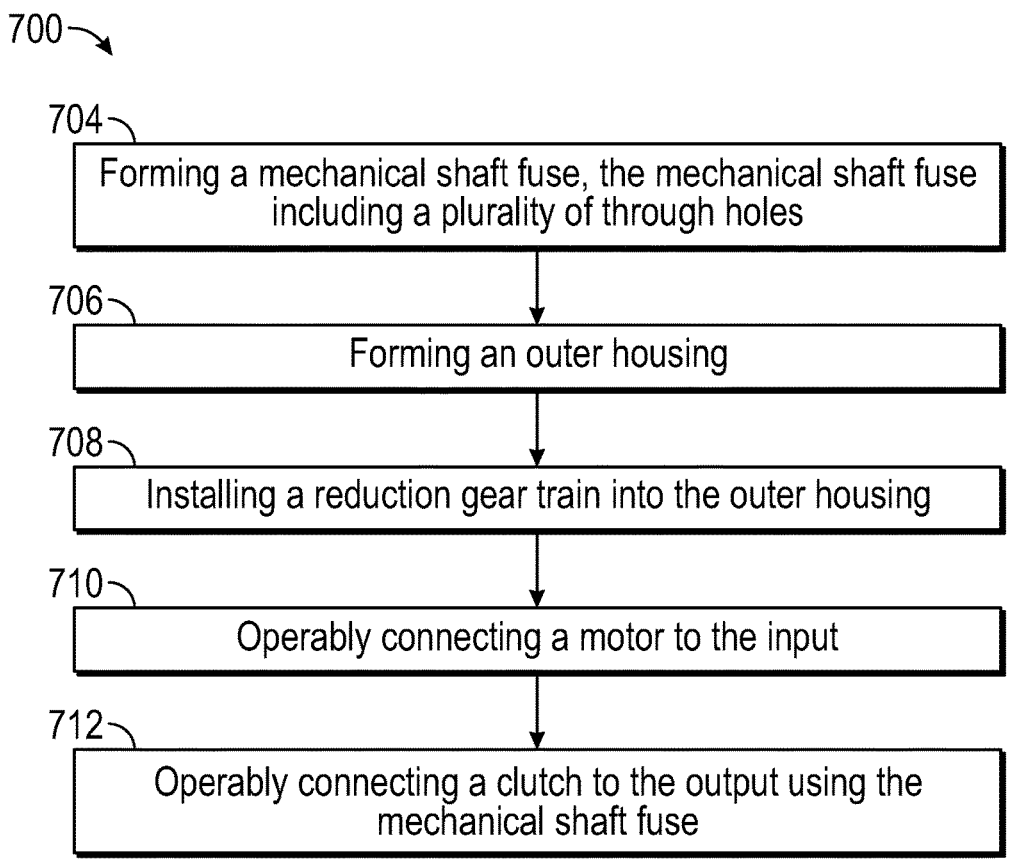
FIG. 6 is a flow process illustrating a method of manufacturing the motoring system of FIGS. 2-5, according to an embodiment of the present disclosure.

Referring now to FIG. 6, while referencing components of the motoring system 100 of FIGS. 2-5, FIG. 6 shows a flow process illustrating a method 700 of manufacturing the motoring system 100 of FIG. 2, according to an embodiment of the present disclosure. At block 704, the mechanical shaft fuse 200 is formed. The plurality of through holes 250 are also formed in the mechanical shaft fuse 200 at block 704. The method 700 may include forming of the other various features discussed above, such as, for example, the interior surface 220 and the reduced outer diameter 270. Forming may include various methods including but not limited to machining, additive manufacturing, drilling, laser etching, injection molding, and/or any other method known to one of skill in the art. At block 706, the outer housing 121 is formed. At block 708, the reduction gear train 122 is installed into the outer housing 121. The reduction gear train 122 has the input 122a and the output 122b, as mentioned above. At block 710, the motor 110 is operably connected to the input 122a. At block 712, the clutch 124 is operably connected to the output 122b using the mechanical shaft fuse 200. As mentioned above, the mechanical shaft fuse 200 is configured to shear when torque on the mechanical shaft fuse 200 is greater than or equal to a selected value.

While the above description has described the flow process of FIG. 6 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A motoring system for a gas turbine engine comprising:
a reduction gear train having an input and an output;
an electric motor operably connected to the input;
a clutch operably connected to the output, the clutch in operation engages and disengages the reduction gear train;
a mechanical shaft fuse operably connecting the output to the clutch, the mechanical shaft fuse in operation shears when torque on the mechanical shaft fuse is greater than or equal to a selected value, wherein the mechanical shaft fuse includes a plurality of through holes;
a starter operably connected to the clutch, the starter having an output shaft; and
an accessory gearbox operably connected to the output shaft of the starter.

2. The motoring system of claim 1, wherein:
the plurality of through holes are oriented around an approximate axial center point of the mechanical shaft fuse.

3. The motoring system of claim 1, wherein:
each of the holes has a diameter of about 0.187 inches (0.475 centimeters).

4. The motoring system of claim 1, wherein:
the plurality of holes comprises six holes.

5. The motoring system of claim 1, wherein:
the selected value is about 64 foot-pounds (87 newton-meters).

6. The motoring system of claim 1, wherein:
the mechanical shaft fuse includes a first outer diameter of about 0.63 inches (1.6 centimeters).

7. The motoring system of claim 1, wherein:
the mechanical shaft fuse is hollow and includes a thickness of about 0.09 inches (0.229 centimeters).

8. The motoring system of claim 1, wherein:
the mechanical shaft fuse has a hexagonal cross-sectional shape.

9. The motoring system of claim 6, wherein the mechanical shaft fuse further comprises:
a second outer diameter located at about an approximate axial center point of the mechanical shaft fuse, the second outer diameter being less than the first outer diameter.

* * * * *